United States Patent
Plevacova et al.

(10) Patent No.: US 10,017,415 B2
(45) Date of Patent: Jul. 10, 2018

(54) VITROCERAMIC PLATE

(71) Applicant: EUROKERA S.N.C., Chateau Thierry (FR)

(72) Inventors: Kamila Plevacova, Paris (FR); Emmanuel Lecomte, Nesles la Montagne (FR); Cécile Jousseaume, Paris (FR); Richard Di Caro, Paris (FR)

(73) Assignee: EUROKERA S.N.C., Chateau Thierry (FR)

( * ) Notice: Subject to any disclaimer, the term of this patent is extended or adjusted under 35 U.S.C. 154(b) by 0 days.

(21) Appl. No.: 15/510,529

(22) PCT Filed: Sep. 11, 2015

(86) PCT No.: PCT/FR2015/052437
§ 371 (c)(1),
(2) Date: Mar. 10, 2017

(87) PCT Pub. No.: WO2016/038319
PCT Pub. Date: Mar. 17, 2016

(65) Prior Publication Data
US 2017/0260086 A1    Sep. 14, 2017

(30) Foreign Application Priority Data

Sep. 12, 2014   (FR) .................... 14 58568

(51) Int. Cl.
| | | |
|---|---|---|
| C03C 10/00 | (2006.01) |
| C03C 3/087 | (2006.01) |
| F24C 15/10 | (2006.01) |
| C03C 8/14 | (2006.01) |
| C03C 23/00 | (2006.01) |

(52) U.S. Cl.
CPC .......... *C03C 10/0027* (2013.01); *C03C 3/087* (2013.01); *C03C 8/14* (2013.01); *C03C 23/007* (2013.01); *F24C 15/10* (2013.01); *C03C 2204/00* (2013.01); *C03C 2209/00* (2013.01)

(58) Field of Classification Search
CPC ...... C03C 10/0027; C03C 3/087; F24C 15/10
See application file for complete search history.

(56) References Cited

U.S. PATENT DOCUMENTS

| | | | |
|---|---|---|---|
| 7,141,521 B2 * | 11/2006 | Siebers ................... | C03C 3/085 501/32 |
| 7,507,681 B2 * | 3/2009 | Aitken .................... | C03C 3/083 501/4 |
| 9,650,286 B2 * | 5/2017 | Comte .................... | C03C 3/087 |

FOREIGN PATENT DOCUMENTS

| | | |
|---|---|---|
| EP | 1 146 018 A1 | 10/2001 |
| EP | 2 284 131 A1 | 2/2011 |
| JP | 11100230 * | 4/1999 |
| JP | 11100231 * | 4/1999 |
| JP | H11-100229 A | 4/1999 |

OTHER PUBLICATIONS

International Search Report as issued in International Patent Application No. PCT/FR2015/052437, dated Dec. 10, 2015.

* cited by examiner

*Primary Examiner* — Karl E Group
(74) *Attorney, Agent, or Firm* — Pillsbury Winthrop Shaw Pittman LLP

(57) ABSTRACT

A transparent, colorless and non-scattering glass-ceramic plate of lithium aluminosilicate type and containing crystals of β-quartz structure, the chemical composition of which does not contain oxides of arsenic, of antimony and of neodymium, and includes the following constituents within the limits defined below, expressed as weight percentages: $SiO_2$ 55-75%; $Al_2O_3$ 12-25%; $Li_2O$ 2-5%; $Na_2O+K_2O$ 0-<2%; $Li_2O+Na_2O+K_2O$ 0-<7%; CaO 0.3-5%; MgO 0-5%; SrO 0-5%; BaO 0.5-10%; CaO+BaO >1%; ZnO 0-5%; $TiO_2$ ≤1.9%; $ZrO_2$ ≤3%; $TiO_2+ZrO_2$ >3.80%; $SnO_2$ ≥0.1%; $SnO_2/(SnO_2+ZrO_2+TiO_2)$<0.1.

17 Claims, No Drawings

VITROCERAMIC PLATE

CROSS-REFERENCE TO RELATED APPLICATIONS

This application is the U.S. National Stage of PCT/FR2015/052437, filed Sep. 11, 2015, which in turn claims priority to French patent application number 1458568 filed Sep. 12, 2014. The content of these applications are incorporated herein by reference in their entireties.

The invention relates to the field of transparent, colorless and non-scattering glass-ceramic plates, in particular used in cooking devices, such as oven door or window panels, or else as fireplace inserts.

The aforementioned applications require plates that have high thermomechanical strength, in particular an excellent thermal shock resistance, and also a resistance to corrosive atmospheres at high temperature. Glass-ceramics of lithium aluminosilicate type meet these particularly demanding specifications. These glass-ceramics are obtained by a two-step process: in a first step, the plates of precursor glass are obtained, which undergo, in a second step, a controlled crystallization treatment. This heat treatment, referred to as "ceramization", makes it possible to grow within the glass crystals of β-quartz or β-spodumene structure (depending on the ceramization temperature), which generally have the distinctive feature of possessing negative thermal expansion coefficients, so much so that the glass-ceramic possesses in the end a very low thermal expansion coefficient.

Various kinds of lithium aluminosilicate glass-ceramic plates are distinguished. Those used in cooking devices, for example of radiant or induction type, are generally either highly tinted, therefore they have a very low light transmission factor, often of at most 3%, or scattering, in order to mask what is located underneath the plate. Tinted glass-ceramics generally contain crystals of β-quartz structure, whereas scattering glass-ceramics generally contain crystals of β-spodumene (or keatite) structure, generated by a ceramization treatment at high temperature, and the larger diameter of which causes a scattering of the light. The crystals of β-quartz structure are solid solutions containing the elements Si, Al, Li, Mg and Zn.

In such applications as fireplace inserts and oven door or window panels, it is important on the contrary for the user to be able to perfectly view what is behind the plate. In order to do this, transparent, colorless and non-scattering glass-ceramics have been developed. Such glass-ceramics may also be used in cooking devices, and are in this case generally combined with masking means, such as opaque organic or mineral coatings.

The term "transparent" is preferably understood to mean the fact that the light transmission factor, within the meaning of the NF EN 410 standard, is at least 70%.

The term "colorless" is preferably understood to mean the fact that the color coordinates in transmission (a*, b*) are at most 20 as an absolute value, using the CIE-1931 reference observer and the D65 reference illuminant.

The term "non-scattering" is preferably understood to mean the fact that the haze, within the meaning of the ASTM D1003-00 standard, is at most 3%, in particular 2% and even 1%. The haze corresponds to the ratio between the diffuse light transmission and the total light transmission, expressed in percent. It is preferably measured using a spectrophotometer (method B of the aforementioned standard).

Conventionally, these glass-ceramics were produced from precursor glasses refined using oxides of antimony or of arsenic. The refining of the glass consists in ridding the molten glass of any gaseous inclusion, and in order to do this it is common to use refining agents, the purpose of which is to generate an intense gas evolution within the molten glass capable of combining the small gaseous inclusions and making them rise to the surface. Considering the toxicity of these refining agents, it has more recently been proposed to use tin oxide ($SnO_2$), which additionally makes it possible to form the glass by the float process, which consists in pouring the glass onto a bath of molten tin. However it appears that this oxide has a tendency to give a yellowish color to the glass-ceramic.

In order to solve this problem, application EP 1 837 313 proposes to discolor the glass-ceramic by using neodymium oxide ($Nd_2O_3$). Besides its high cost, this oxide is however capable of producing a pink color when its addition is poorly controlled, while reducing the light transmission of the glass-ceramic. Application EP 2 284 131 proposes to reduce the content of $ZrO_2$ and especially $TiO_2$ nucleating agents, by using total contents of less than 3.8%. However, it has turned out that such low contents could lead to an uncontrolled growth of crystals of β-quartz structure, capable of generating haze.

One objective of the invention is to propose a transparent, colorless and non-scattering glass-ceramic, which does not use oxides of arsenic and of antimony, the composition of which is compatible with the rolling process of the glass, which may be produced with a reduced cost and that has the lowest possible residual yellow color.

For this purpose, one subject of the invention is a transparent, colorless and non-scattering glass-ceramic plate of lithium aluminosilicate type and containing crystals of β-quartz structure, the chemical composition of which does not contain oxides of arsenic, of antimony and of neodymium, and comprises the following constituents within the limits defined below, expressed as weight percentages:

$SiO_2$ 55-75%, in particular 60-70%,
$Al_2O_3$ 12-25%, in particular 19-24%,
$Li_2O$ 2-5%, in particular 3-4%,
$Na_2O+K_2O$ 0-<2%, in particular 0-1%,
$Li_2O+Na_2O+K_2O$ 0-<7%, in particular 0-5%,
CaO 0.3-5%,
MgO 0-5%, in particular 0-1%,
SrO 0-5%, in particular 0-1%,
BaO 0.5-10%, in particular 1-5%,
CaO+BaO >1%, in particular 3-5%,
ZnO 0-5%, in particular 1-2%,
$TiO_2$ ≤1.9%,
$ZrO_2$ ≤3%, in particular 2-3%,
$TiO_2+ZrO_2$ >3.80%,
$SnO_2$ ≤0.1%,
$SnO_2/(SnO_2+ZrO_2+TiO_2)$ <0.1, in particular <0.06.

The light transmission factor of the plate according to the invention is preferably at least 75%, in particular 80%. This factor is typically calculated according to the NF EN 410 standard from a transmission spectrum measured using a spectrophotometer. Such values are particularly sizeable in the case of plates used as oven doors, fireplace inserts and fire-resistant glazings, in order to ensure the best possible visibility for the users.

The b* color coordinate of the plate according to the invention is preferably at most 20, in particular 15. A low (positive) value of b* expresses a more neutral, less yellow tint. The b* coordinate is preferably at least −2, or else 0. The a* coordinate is itself preferably between −5 and +5, in particular between −2 and +1. These magnitudes are calculated in a known manner from an experimental spectrum produced for wavelengths between 380 and 780 nm, by taking into consideration the D65 illuminant as defined by the ISO/CIE 10526 standard and the C.I.E. 1931 colorimetric reference observer as defined by the ISO/CIE 10527 standard.

The various aforementioned optical properties are measured or calculated for the actual thickness of the plate.

The glass-ceramic preferably has a coefficient of linear thermal expansion of at most $10 \times 10^{-7}$ $K^{-1}$ between 20 and 700° C., in order to guarantee an excellent thermal shock resistance. The coefficient of linear thermal expansion is measured in a known manner using a dilatometer, in particular according to the ISO 7991:1987 standard.

The crystals of β-quartz structure advantageously have a size of at most 100 nm, in particular 80 nm, in order to prevent the scattering of the light. This size corresponds to the mean size which may be deduced from x-ray diffraction diagrams by the Rietveld method.

The chemical composition of the glass-ceramic plate comprises the oxides indicated above. Preferably, it consists essentially of these oxides. The expression "consists essentially of" is understood in the sense that the aforementioned oxides constitute at least 96%, or else 98% and even 99% of the weight of the glass-ceramic.

All the contents indicated in the present text are weight contents.

Silica ($SiO_2$) is the main glass former oxide. High contents will contribute to increasing the viscosity of the glass beyond what is acceptable, whereas excessively low contents will increase the thermal expansion coefficient. The silica content is preferably within a range extending from 60 to 70%, in particular from 62 to 66%.

Alumina ($Al_2O_3$) also contributes to increasing the viscosity of the glass and therefore to rendering it more difficult to melt. When it is present in excessively low contents, the glass is however difficult to ceramize. The alumina content is preferably within a range extending from 19 to 24%, in particular from 20 to 23%.

Lithium oxide ($Li_2O$) is essential for the formation of β-quartz crystals. A minimum content is also necessary in order to reduce the viscosity of the glass at high temperature. The $Li_2O$ content is preferably within a range extending from 3 to 4%, in particular from 3.5 to 4%.

The sum of the contents of sodium oxide ($Na_2O$) and potassium oxide ($K_2O$), denoted by $Na_2O+K_2O$, is limited in order to ensure a low thermal expansion coefficient. This sum is advantageously at most 1.5%, or else 1%.

In order to ensure an adequate viscosity at high temperature, that makes it possible to optimize both the melting and forming of the precursor glass, the composition of the plate contains lime (CaO) and barium oxide (BaO) in the aforementioned contents. The sum of the contents of CaO and BaO (denoted by) CaO+BaO is preferably within a range extending from 3 to 5%, in particular from 3 to 4%.

The CaO content is preferably at least 0.8%, in particular 1% and even 1.2%. Contents of at most 3% and even 2% are preferred, on the one hand in order to prevent excessively high corrosion of the refractory materials of the furnace, and on the other hand in order to limit the formation of potentially scattering crystals. CaO makes it possible to reduce the thermal expansion coefficient of the glass-ceramic, in particular when it is substituted for BaO.

The BaO content is preferably at least 1%, in particular 2%. It is advantageously at most 5%, or else 4% and even 3%.

The MgO content is preferably at most 1% and even 0.6%. Contents ranging from 0.2 to 0.6% are preferred.

The SrO content is preferably at most 1%. It is even advantageously zero.

The ZnO content is advantageously within a range extending from 1 to 2%. During the ceramization, this oxide participates in the formation of the crystals of β-quartz structure, and therefore contributes to the lowering of the thermal expansion coefficient.

The oxides of titanium ($TiO_2$) and of zirconium ($ZrO_2$) act as nucleating agents and promote the bulk crystallization of the crystals of β-quartz structure. Their combined presence is obligatory, and their respective contents have been optimized by the inventors in order to provide the glass-ceramic with good optical properties. The sum of their contents ($TiO_2+ZrO_2$), which must be greater than 3.80%, is preferably greater than 4%. The inventors have indeed been able to observe that for excessively low values, the β-quartz crystals could have sizes of greater than 100 nm, or else 200 nm, leading to an undesirable scattering of the light. The $TiO_2$ content is preferably at most 1.8%, in particular within a range extending from 1.4 to 1.8%, or else from 1.5 to 1.8%. Indeed, it is important to limit the $TiO_2$ content in order to reduce the yellow color of the glass-ceramic as much as possible. The zirconium oxide content is also limited in order not to lead to excessively high liquidus temperatures.

Tin oxide ($SnO_2$) is a refining agent. Its content is preferably at least 0.15% in order to ensure a refining of excellent quality. It has however become apparent to the inventors that this oxide also plays a role during the ceramization as well as in the appearance of the yellow color, thus influencing both the optical and thermomechanical properties of the glass-ceramic. The inventors have been able to demonstrate that the $SnO_2/(SnO_2+ZrO_2+TiO_2)$ ratio should be less than 0.1, preferably 0.08, or even 0.07, 0.06 or else 0.05. Such a condition ensures both an excellent transparency and a low thermal expansion coefficient.

Iron oxide ($Fe_2O_3$) is a widespread impurity, and therefore is inevitably present in the plate according to the invention. Since this oxide contributes to yellowing the plate, its content is advantageously at most 300 ppm (0.03%), in particular 250 ppm, or else 150 ppm.

As indicated above, the composition of the glass-ceramic is free of oxides of arsenic and of antimony. This is understood to mean that these oxides are at best present only in the form of traces, their total content not exceeding 1000 ppm, or else 500 ppm and even 200 ppm. Their total content is even advantageously zero.

The composition of the glass-ceramic is also free of neodymium oxide. More generally, it is advantageously free of oxides of rare earth elements (lanthanides), which are expensive and reduce the light transmission of the glass-ceramic.

For the same reason, the composition of the glass-ceramic preferably does not contain any coloring agent selected from $Cr_2O_3$, CuO, Se, NiO, $V_2O_5$, or else sulfides. The composition may nevertheless comprise small amounts of cobalt oxide (CoO), at most 30 ppm and even 10 ppm, in order to reduce the yellow color even more.

The glass-ceramic plate preferably has a thickness within a range extending from 1 to 8 mm, in particular from 2 to 6 mm, or else from 3.8 to 5.2 mm. Its lateral dimensions (after cutting to the usage dimensions) typically range from 30 cm to 200 cm, in particular from 50 cm to 150 cm.

The composition of the glass-ceramic is preferably free of phosphorus oxide $P_2O_5$. This is understood to mean that $P_2O_5$ is at best present only in the form of traces, its content not exceeding 400 ppm. It is advantageously zero. This is because $P_2O_5$ has a tendency to promote the appearance of β-spodumene crystals during the manufacturing of the glass-ceramic but also during the use thereof. The presence of $P_2O_5$ may thus cause the appearance of haze zones, in particular at the hot spots, during the aging of the glass-ceramic.

Another subject of the invention is a glass plate capable of being converted to a glass-ceramic plate according to the invention by a ceramization treatment. The chemical composition of the glass plate is substantially identical to that of the glass-ceramic plate. It is on the other hand of glassy nature, free of crystals.

Yet another subject of the invention is a process for obtaining a glass-ceramic plate according to the invention, comprising a melting step, a forming step, then a ceramization step.

The melting is typically carried out in refractory furnaces with the aid of burners that use air or, better still, oxygen as oxidizer and natural gas or fuel oil as fuel. Resistance heaters made of molybdenum or of platinum submerged in the glass being melted may also provide all or some of the energy used in order to obtain a molten glass. Raw materials (silica, spodumene, petalite, lithium carbonate, etc.) are introduced into the furnace and undergo, under the effect of the high temperatures, various chemical reactions, such as decarbonization reactions, actual melting reactions, etc. The lithium carrier is preferably lithium carbonate, the content of impurities of which is lower than those customarily encountered in natural carriers such as spodumene or petalite. Natural carriers that are low in impurities (for example comprising less than 200 ppm of iron oxide) can however be used. The maximum temperature reached by the glass is typically at least 1500° C., in particular between 1600 and 1700° C. The forming of the glass into plates may be carried out in a known manner by rolling the glass between metal or ceramic rolls, by drawing (upward or downward) or else by floating, a technique that consists in pouring the molten glass onto a bath of molten tin.

The ceramization step preferably involves a thermal cycle that uses a rise in temperature to a crystallization temperature preferably within a range extending from 850 to 1000° C., in particular from 860 to 960° C. The choice of the ceramization temperatures and/or times, to suit each composition, makes it possible to adjust the thermal expansion coefficient of the material obtained by varying the size and the amount of crystals. Preferably, the thermal cycle comprises a rise to a temperature between 650° C. and 860° C. for a duration of 15 to 200 minutes (nucleation step) then a rise to a temperature between 860 and 960° C. for a duration of 5 to 120 minutes (crystalline growth step).

Another subject of the invention is articles comprising at least one glass-ceramic plate according to the invention.

Such articles are in particular:
a cooking device,
a domestic oven door, in particular as a plate intended to be the closest to the chamber of said oven,
a fireplace insert,
a fire-resistant glazing.

The cooking device is preferably of radiant or induction type. It is preferable that the plate be capable of concealing the heating means (for example inductors), the electric wiring, and also the circuits for controlling and monitoring the cooking device. For this purpose, it is possible to provide a portion of the surface of the plate (that which in the cooking device is located opposite the elements to be concealed) with a coating deposited on and/or underneath the plate, said coating having the ability to absorb and/or reflect and/or scatter the light radiation. The coating may be deposited underneath the plate, that is to say on the surface facing the internal elements of the device, also referred to as the "lower face", and/or on the plate, that is to say on the upper face. The coating may be an organic-based layer such as a layer of paint, resin or lacquer, or a mineral-based layer such as an enamel or a metal layer or a metal oxide, nitride, oxynitride or oxycarbide layer. Preferably, the organic layers will be deposited on the lower face, whilst the mineral layers, in particular the enamels, will be deposited on the upper face. The various internal elements of the cooking device may also be concealed by an opaque sheet positioned between the latter and the plate, for example a sheet of mica. Besides the glass plate and at least one inductor (preferably three, or else four and even five inductors), the cooking device may comprise at least one light-emitting device, and at least one control and monitoring device, which are all in a housing. One, the or each light-emitting device is advantageously selected from light-emitting diodes (for example belonging to 7-segment displays), liquid-crystal displays (LCDs), optionally organic light-emitting diodes (OLEDs), and fluorescent displays (VFDs). The colors seen through the plate are numerous: red, green, blue, and all possible combinations, including yellow, violet, white, etc. These light-emitting devices may be purely decorative, for example to visually separate various zones of the plate. Most often however they will have a functional role displaying various information useful for the user, in particular an indication of the heating power, of the temperature, of cooking programs, of cooking time, or of zones of the plate exceeding a predetermined temperature. The control and monitoring devices generally comprise touch switches, for example of capacitive or infrared type. All of the internal elements are generally attached to a housing, often metallic, which therefore constitutes the lower part of the cooking device, normally concealed in the worktop or in the body of the cooker.

The domestic oven door according to the invention preferably comprises an inner plate and an outer plate, these two plates forming the two main outer flat faces of the door, so that once the door is fitted to the oven, the inner plate is closest to the chamber of the oven, and the outer plate is closest to the user. The oven door according to the invention preferably comprises at least one intermediate plate located between the inner glass plate and the outer plate, and separated from each of the latter by at least one air space. A preferred door comprises three or four plates, and therefore one or two intermediate plate(s). The intermediate and outer plates are preferably made of glass, in particular soda-lime-silica or borosilicate glass. At least one plate, in particular an intermediate plate, is advantageously coated with a low-emissivity layer, in particular with a layer of a transparent electrically conductive oxide (TCO), such as for example tin oxide doped in particular with fluorine or with antimony. The presence of such layers makes it possible to reduce the heat exchanges between the plates, thus contributing to improving the thermal insulation of the door.

The following exemplary embodiments illustrate the invention without limiting it.

Glass-ceramic plates were prepared in the following manner: various samples of glass having the chemical compositions reported in the tables below were obtained in a conventional manner by melting pulverulent raw materials.

The samples, in the form of a 5 mm thick plate, were then subjected to a ceramization treatment.

Tables 1 to 3 below summarize the results obtained by indicating for each example:

- its chemical composition by weight,
- the temperature at which the glass has a viscosity of 10 000 poise (1 poise=0.1 Pa·s), denoted by T4 and expressed in ° C.,
- the ceramization temperature, denoted by $T_c$ and expressed in ° C.,
- the ceramization time, denoted by $t_c$ and expressed in minutes,
- the coefficient of linear thermal expansion of the glass-ceramic between 30 and 700° C., denoted by α and expressed in $10^{-7}$/K,
- the appearance of the glass-ceramic, T for transparent and S for scattering,
- the light transmission factor within the meaning of the NF EN 410 standard, denoted by TL and expressed in %,
- the color coordinate in transmission b*, calculated from an experimental spectrum, using the CIE-1931 reference observer and the D65 reference illuminant.

Examples C1 and C2 are comparative examples. Since their contents of titanium and zirconium oxides are too low, the glass-ceramics obtained have an unacceptable haze. Examples 1 to 11 are examples according to the invention.

TABLE 1

|  | C1 | C2 | 1 | 2 | 3 |
|---|---|---|---|---|---|
| $SiO_2$ | 64.9 | 64.2 | 63.2 | 63.1 | 63.6 |
| $Al_2O_3$ | 21.6 | 21.3 | 22.0 | 21.4 | 21.7 |
| $Li_2O$ | 3.70 | 3.60 | 3.90 | 3.70 | 3.70 |
| $Na_2O$ | 0.68 | 0.68 | 0.77 | 0.80 | 0.71 |
| $K_2O$ | 0.25 | 0.24 | 0.28 | 0.25 | 0.26 |
| MgO | 0.29 | 0.27 | 0.40 | 0.37 | 0.47 |
| CaO | 1.31 | 0.38 | 1.00 | 0.49 | 1.11 |
| BaO | 2.04 | 3.99 | 2.05 | 4.27 | 2.51 |
| ZnO | 1.50 | 1.55 | 1.60 | 1.47 | 1.47 |
| $TiO_2$ | 1.41 | 1.44 | 1.81 | 1.53 | 1.71 |
| $ZrO_2$ | 2.00 | 2.02 | 2.60 | 2.29 | 2.52 |
| $TiO_2 + ZrO_2$ | 3.41 | 3.46 | 4.41 | 3.82 | 4.23 |
| $SnO_2$ | 0.31 | 0.34 | 0.23 | 0.33 | 0.19 |
| $SnO_2/(TiO_2 + ZrO_2 + SnO_2)$ | 0.083 | 0.089 | 0.049 | 0.079 | 0.043 |
| T4 (° C.) | 1301 | 1307 | — | — | — |
| $T_c$ (° C.) | 890 | 890 | 890 | 890 | 880 |
| $t_c$ (min) | 35 | 35 | 35 | 35 | 15 |
| α ($10^{-7}$/K) | — | — | — | 5.8 | 5.1 |
| Appearance | S | S | T | T | T |
| TL (%) | — | — | 78.0 | 77.7 | 75.5 |
| b* | — | — | 12.1 | 13.6 | 11.9 |

TABLE 2

|  | 4 | 5 | 6 | 7 | 8 |
|---|---|---|---|---|---|
| $SiO_2$ | 63.6 | 64.1 | 64.4 | 63.7 | 64.2 |
| $Al_2O_3$ | 21.5 | 21.1 | 21.0 | 21.7 | 22.0 |
| $Li_2O$ | 3.69 | 3.70 | 3.69 | 3.80 | 3.66 |
| $Na_2O$ | 0.84 | 0.87 | 0.83 | 0.65 | 0.69 |
| $K_2O$ | 0.26 | 0.26 | 0.27 | 0.27 | 0.26 |
| MgO | 0.47 | 0.48 | 0.48 | 0.48 | 0.30 |
| CaO | 1.25 | 1.35 | 1.33 | 1.26 | 1.34 |
| BaO | 2.20 | 2.02 | 2.01 | 2.02 | 2.06 |
| ZnO | 1.50 | 1.50 | 1.48 | 1.49 | 1.41 |
| $TiO_2$ | 1.72 | 1.72 | 1.72 | 1.75 | 1.75 |
| $ZrO_2$ | 2.55 | 2.52 | 2.40 | 2.36 | 2.10 |
| $TiO_2 + ZrO_2$ | 4.27 | 4.27 | 4.12 | 4.11 | 3.85 |
| $SnO_2$ | 0.26 | 0.36 | 0.41 | 0.18 | 0.26 |
| $SnO_2/(TiO_2 + ZrO_2 + SnO_2)$ | 0.057 | 0.078 | 0.088 | 0.042 | 0.063 |
| T4 (° C.) | 1280 | — | 1280 | 1280 | 1288 |
| $T_c$ (° C.) | 890 | 870 | 890 | 890 | 890 |
| $t_c$ (min) | 35 | 35 | 35 | 35 | 35 |
| α ($10^{-7}$/K) | 6.7 | 7.3 | — | 5.0 | 3.1 |
| Appearance | T | T | T | T | T |
| TL (%) | 81.5 | — | 74.2 | 81.6 | 77.3 |
| b* | 8.4 | — | 14.7 | 8.4 | 10.4 |

TABLE 3

|  | 9 | 10 | 11 |
|---|---|---|---|
| $SiO_2$ | 64.0 | 63.6 | 64.3 |
| $Al_2O_3$ | 21.9 | 21.9 | 21.6 |
| $Li_2O$ | 3.53 | 3.51 | 3.50 |
| $Na_2O$ | 0.74 | 0.72 | 0.61 |
| $K_2O$ | 0.27 | 0.28 | 0.27 |
| MgO | 0.30 | 0.40 | 0.29 |
| CaO | 1.35 | 1.29 | 1.27 |
| BaO | 2.14 | 2.04 | 2.02 |
| ZnO | 1.49 | 1.63 | 1.41 |
| $TiO_2$ | 1.75 | 1.82 | 1.74 |
| $ZrO_2$ | 2.20 | 2.60 | 2.36 |
| $TiO_2 + ZrO_2$ | 3.95 | 4.42 | 4.10 |
| $SnO_2$ | 0.30 | 0.23 | 0.27 |
| $SnO_2/(TiO_2 + ZrO_2 + SnO_2)$ | 0.071 | 0.078 | 0.062 |
| T4 (° C.) | — | — | 1300 |
| $T_c$ (° C.) | 890 | 890 | 890 |
| $t_c$ (min) | 35 | 35 | 35 |
| α ($10^{-7}$/K) | 4.4 | — | 3.1 |
| Appearance | T | T | T |
| TL (%) | 82.5 | 78.0 | 85.5 |
| b* | 7.8 | 12.1 | 6.4 |

The invention claimed is:

1. A transparent, colorless and non-scattering glass-ceramic plate of lithium aluminosilicate and containing crystals of β-quartz structure, the chemical composition of which does not contain oxides of arsenic, of antimony and of neodymium, and comprises the following constituents within the limits defined below, expressed as weight percentages:

| $SiO_2$ | 55-75%, |
|---|---|
| $Al_2O_3$ | 12-25%, |
| $Li_2O$ | 2-5%, |
| $Na_2O + K_2O$ | 0-<2%, |
| $Li_2O + Na_2O + K_2O$ | 0-<7%, |
| CaO | 0.3-5%, |
| MgO | 0-5%, |
| SrO | 0-5%, |
| BaO | 0.5-10%, |
| CaO + BaO | >1%, |
| ZnO | 0-5%, |
| $TiO_2$ | ≤1.9%, |
| $ZrO_2$ | ≤3%, |
| $TiO_2 + ZrO_2$ | >3.80%, |
| $SnO_2$ | ≥0.1%, |
| $SnO_2/(SnO_2 + ZrO_2 + TiO_2)$ | <0.1 |

2. The glass-ceramic plate as claimed in claim 1, wherein a light transmission factor of the glass-ceramic plate is at least 75%, and the b* color coordinate of the glass-ceramic plate is at most 20.

3. The glass-ceramic plate as claimed in claim 1, wherein the glass-ceramic has a coefficient of linear thermal expansion of at most $10 \times 10^{-7}$ $K^{-1}$ between 20 and 700° C.

4. The glass-ceramic plate as claimed in claim 1, wherein the crystals of β-quartz structure have a size of at most 100 nm.

5. The glass-ceramic plate as claimed in claim 1, wherein a sum of the TiO$_2$ and ZrO$_2$ contents is greater than 4%.

6. The glass-ceramic plate as claimed in claim 1, wherein the TiO$_2$ content is at most 1.8%.

7. The glass-ceramic plate as claimed in claim 1, wherein the SnO$_2$ content is at least 0.15%.

8. The glass-ceramic plate as claimed in claim 1, wherein the CaO content is at least 0.8%.

9. A glass plate capable of being converted to a glass-ceramic plate as claimed in claim 1 by a ceramization treatment.

10. A cooking device comprising at least one plate as claimed in claim 1.

11. A domestic oven door comprising at least one plate as claimed in claim 1.

12. A fireplace insert comprising at least one plate as claimed in claim 1.

13. A fire-resistant glazing comprising at least one plate as claimed in claim 1.

14. A process for obtaining a glass-ceramic plate as claimed in claim 1, comprising performing a melting step, a forming step, then a ceramization step.

15. The glass-ceramic plate as claimed in claim 1, comprising, expressed as weight percentages:

| | |
|---|---|
| SiO$_2$ | 60-70%, |
| Al$_2$O$_3$ | 19-24%, |
| Li$_2$O | 3-4%, |
| Na$_2$O + K$_2$O | 0-1%, |
| Li$_2$O + Na$_2$O + K$_2$O | 0-5%, |
| CaO | 0.3-5%, |
| MgO | 0-1%, |
| SrO | 0-1%, |
| BaO | 1-5%, |
| CaO + BaO | 3-5%, |
| ZnO | 1-2%, |
| TiO$_2$ | ≤1.9%, |
| ZrO$_2$ | 2-3%, |
| TiO$_2$ + ZrO$_2$ | >3.80%, |
| SnO$_2$ | ≥0.1%, |
| SnO$_2$/(SnO$_2$ + ZrO$_2$ + TiO$_2$). | <0.06 |

16. The glass-ceramic plate as claimed in claim 2, wherein the b* color coordinate of the glass-ceramic plate is at most 15.

17. The domestic oven door as claimed in claim 11, wherein the plate is the closest to a chamber of said an oven that includes the domestic oven door.

* * * * *